Figure 1:
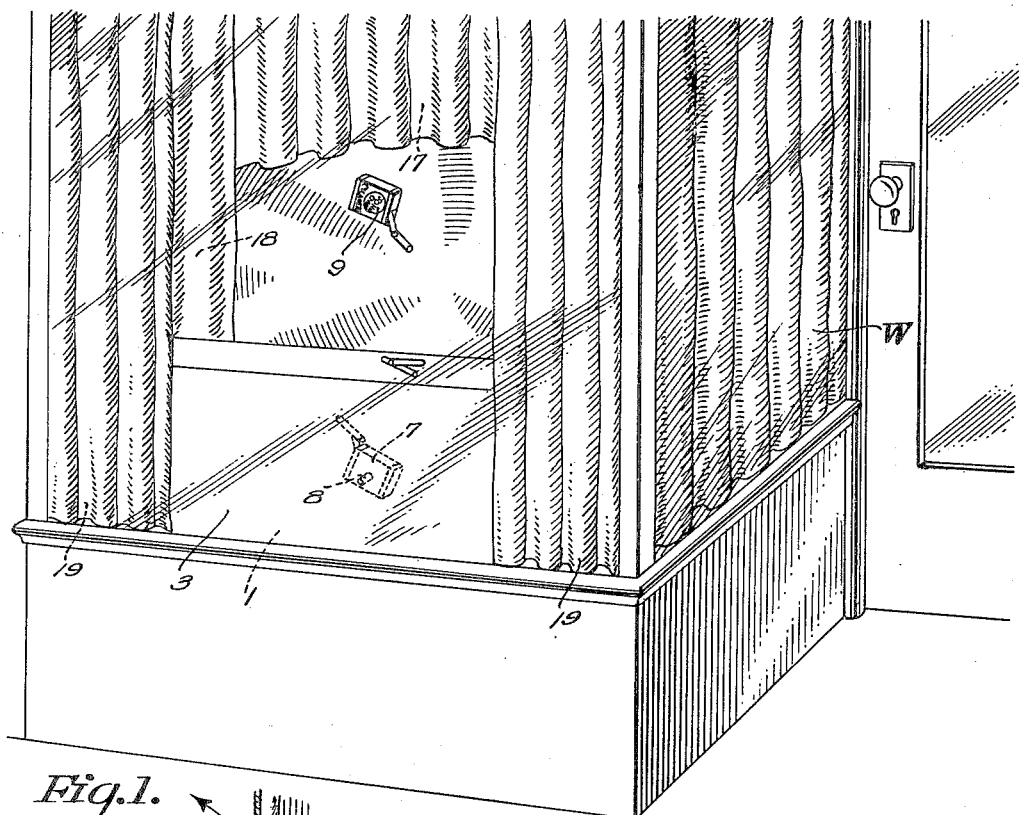

Jan. 22, 1929.  M. CURRY  1,699,689

ADVERTISING APPARATUS

Filed Aug. 11, 1925   2 Sheets-Sheet 1

INVENTOR
Malcolm Curry
BY
ATTORNEYS

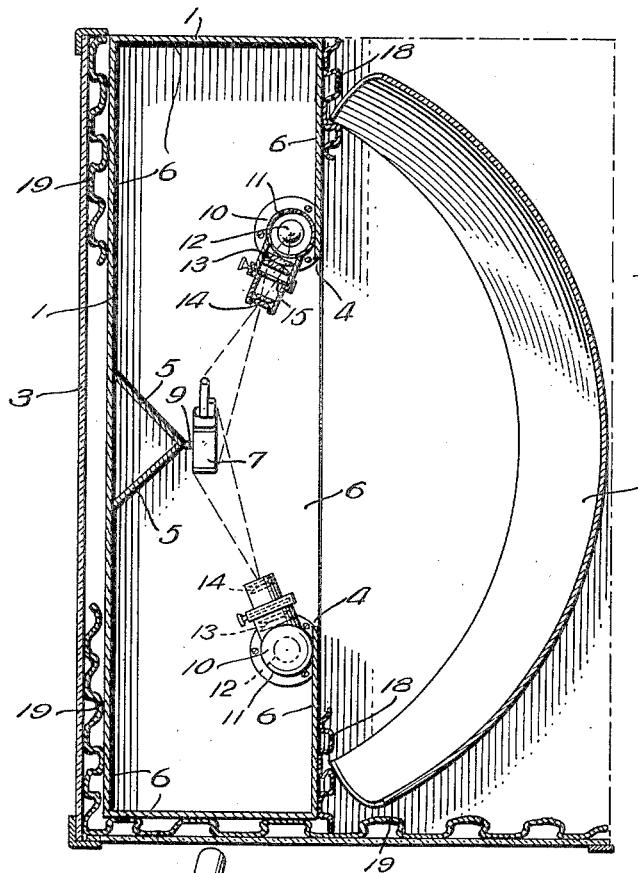
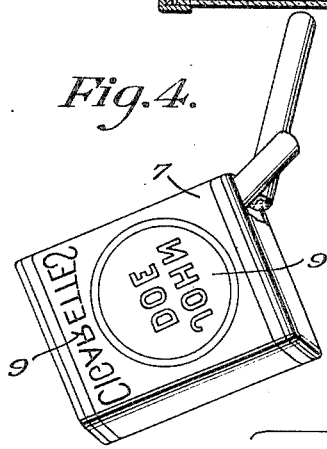
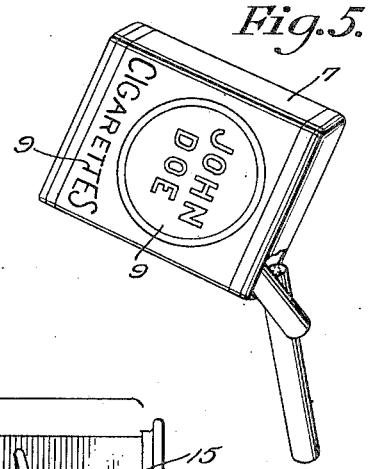
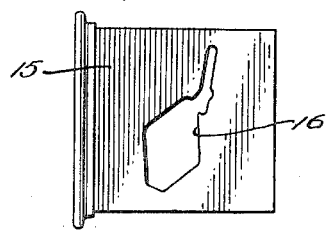
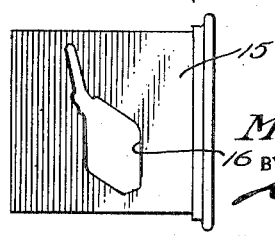

Patented Jan. 22, 1929.

1,699,689

UNITED STATES PATENT OFFICE.

MALCOLM CURRY, OF SCARSDALE, NEW YORK.

ADVERTISING APPARATUS.

Application filed August 11, 1925. Serial No. 49,660.

This invention relates to advertising apparatus and it has for an object the provision of simple and effective means for so creating an optical illusion of the device or goods to be advertised that a real image of said device or goods will appear to be the actual thing in space and unsupported.

A further object of the invention is to create a real image of reading matter with said matter so arranged in the image as to be in readable form. This is accomplished by producing the matter in reverse so that the reflection constituting the image will correct the reverse arrangement of the matter and present it to the observer in readable form. Where advertising matter is printed directly on the device or goods to be advertised such printed matter is in reverse form in order that it shall be corrected and in readable form in the image.

Figure 2:
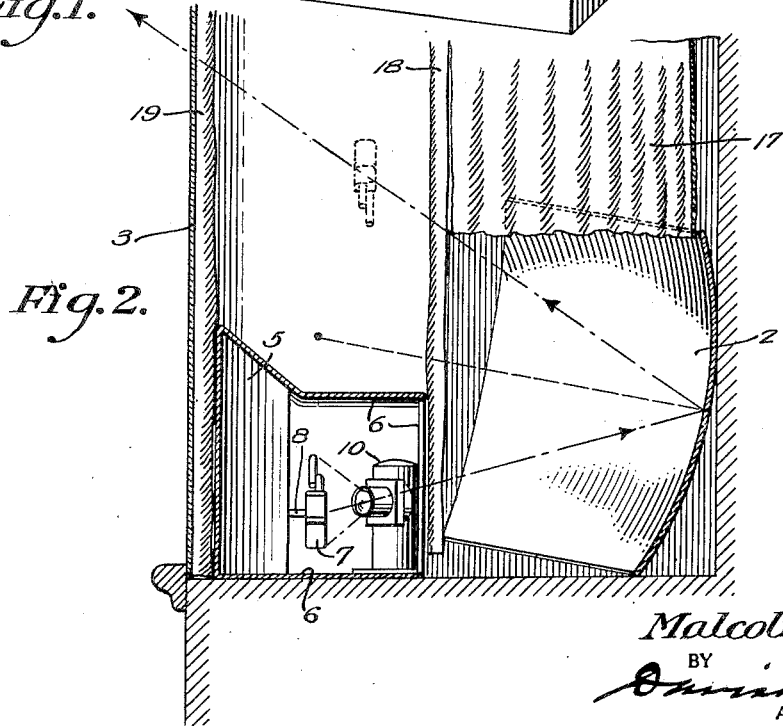

In the drawings:

Fig. 1 is a perspective view showing my advertising apparatus operatively positioned in a show window;

Fig. 2 a vertical section taken through the show window and the advertising apparatus;

Fig. 3 a horizontal section taken on the line 3—3 of Fig. 2;

Fig. 4 a perspective view of the object to be advertised;

Fig. 5 a view of the image of said object created by the apparatus; and

Fig. 6 a view showing the two slides for regulating the projection of light upon the object in creating the image.

Referring to the parts by numerals, 1 designates an elongated casing adapted to be mounted within a show window, W. Located back of the box 1 within the window enclosure is a concave mirror 2. The casing 1 is preferably positioned upon the floor of the window enclosure and extends throughout substantially the width of the window adjacent the front glass 3. The casing is entirely closed on all sides except at the rear where it is centrally formed with an opening 4 directed toward the mirror. The inner walls of the casing are blackened to absorb light. Projecting into the box from the front wall thereof are a pair of rearwardly converging vertical walls 5 which form a salient directed toward the mirror in transverse line with the center of the opening 4. Upon the end of the salient the object 7 to be advertised is supported by a pin or wire 8. In the present instance the object 7 is in the form of a cigarette package with several cigarettes secured to and protruding from it. One side of the package, facing the mirror, is provided with printed advertising captions 9. These captions are printed in reverse, as shown in Fig. 4.

A pair of light-projecting lanterns 10 are mounted within the casing 1 adjacent opposite sides of the opening 4 and rearwardly of the object 7. Each lantern comprises a casing 11 enclosing a lamp 12 and light-projecting means including spaced lenses 13 and 14. These lenses are directed toward the object and an opaque slide or screen 15 is slidably mounted in the space between them. This slide is formed with an aperture 16 conforming in outline to the contour of the object as viewed from the position of that particular screen. The size of this aperture and the location of the screen with relation to the object are such as to confine the light-projection solely to the object. This prevents the illumination of the inner walls of the casing and thus the possibility of the reflected rays from said walls reaching the mirror is avoided.

The concave mirror 2 is uniformly curved in all directions so that its reflecting surface conforms to the surface of a sphere and the mirror would accurately receive and fit over a portion of a sphere of a radius equal to the radius of curvature of the mirror. Such a mirror is adapted to produce a real image located in front of its reflecting surface when the object is positioned outside of the focus of the mirror. In the present instance the object is located at a distance from the mirror substantially equal to its radius of curvature and the mirror is slightly tilted so that it faces outwardly over the top of the casing 1 and through the window. The mirror will therefore produce an image located over the casing and of the same size as the object, as shown in Fig. 2. The image will be reversed both vertically and horizontally from the object 7 and the advertising captions will be presented thereon in readable form as shown in Fig. 5. The illusion of a package of cigarettes unsupported in the air will thus be created.

The upper edge of the mirror is preferably concealed by a curtain 17 draped to conform to the curvature of said edge and the side edges of the mirror are concealed by curtains 18. At the inner side of the window glass 3 side curtains 19 are also draped. These curtains 19 conceal the ends of the casing and also confine the zone of vision through the window to the visibility zone of the image, as determined by the arrangement of the object and the mirror.

The arrangement described and shown in the drawings insures the production of a clean-cut, distinct image. The manner of concentrating and projecting light upon the object contributes greatly to this result. The angular arrangement of the object-supporting walls 5 is such as to prevent rays of light which may fall upon them from being reflected out through the opening 4 to the mirror. This arrangement of said walls, and the blackening of all of the inside walls of the casing so as to absorb light, create a dark background against which the illuminated object is vividly contrasted as viewed from the mirror.

It will be understood that the arrangement disclosed is susceptible of certain changes without departing from the spirit of the invention. The reversely printed advertising may, for example, be mounted otherwise than upon the object advertised. The object and the mirror may also be so relatively positioned as to change the location of the image from that shown. If desired, by properly locating the object between the focus of the mirror and its center of curvature, an enlarged image may be made to appear outside of the window over the sidewalk.

What I claim is:

1. An advertising apparatus comprising an object, concave spherical mirror means exposed to said object and located at a distance from it greater than the focal length of the mirror means, a pair of light sources located at opposite sides of the object and between the object and the mirror, means to concentrate light rays from each of said sources and direct them upon surfaces of the object exposed to the mirror, and an opaque screen located between each light source and the object, each of said screens having an area adapted to admit light through it, said area being similar in outline to the contour of the object as viewed from the position of the screen, whereby illumination from said sources is confined within the contours of the object, the said mirror means being adapted to form a real image of the object.

2. An advertising apparatus comprising an object, concave spherical mirror means exposed to said object and located at a distance from it greater than the focal length of the mirror means, a light source, means to concentrate light rays from said source and direct them toward the object, and an opaque screen located between the said light source and object, said screen having an area adapted to admit light through it, said area being similar in outline to the contour of the object as viewed from the position of the screen, whereby said screen will confine the illumination from the screen within the said contour of the object, the said mirror means being adapted to form a real image of the object in front of the mirror means.

3. An advertising apparatus comprising an object, concave spherical mirror means exposed to said object and located at a distance from it greater than the focal length of the mirror means, an advertising caption carried by the object and facing toward the mirror means, the said caption having its lettering arranged in reverse order, a pair of light sources located at opposite sides of the object and between the object and the mirror means, means to concentrate light rays from each of said sources and direct them toward the object, a pair of opaque screens each located between one of the light sources and the object, each screen having an area adapted to admit light through it, said area being similar in outline to the contour of the object as viewed from the position of the screen, whereby the illumination from the light sources will be confined within the contours of the object, and means forming a light-absorbing background for said object as viewed from the mirror means, said mirror means being adapted to form a real image of the object in front of the mirror means.

4. An advertising apparatus comprising a concave spherical mirror; an object in the form of a commercial article exposed to said mirror and located at a distance from it greater than the focal length of the mirror; an advertising caption carried by the object and facing the mirror, said caption having its lettering arranged in reverse order with relation to the object and the body of the caption as viewed from the mirror; a light source to illuminate said object; an opaque screen having an area adapted to admit light through it, said area being similar in outline to the contour of the object as viewed from the position of the screen; and means to conceal the object and the light source from the observer, whereby a real image of the object will be formed in front of the mirror with the advertising caption displayed upon said image in true readable form.

5. An advertising apparatus comprising a concave spherical mirror; an object in the form of a commercial article exposed to said mirror and located at a distance from it greater than the focal length of the mirror; an advertising caption directly upon the object and facing the mirror, said caption having its lettering arranged in reverse order with relation to the object and the body of the caption as viewed from the mirror; a light source to illuminate said object; and an opaque screen having an area adapted to admit the passage of light through it, said area being similar in outline to the contour of the object as viewed from the position of the screen, whereby illumination from said source is confined within the said contour of the object.

6. An advertising apparatus comprising a show window with a front glass panel; a concave spherical mirror spaced back of said panel and facing outward through it; an object in the form of a commercial article exposed to said mirror and located between the mirror and the panel at a distance from the mirror greater than the focal distance thereof; an advertising caption directly upon the object and facing the mirror, said caption having its lettering arranged in reverse order with relation to the object and the body of the caption as viewed from the mirror; means back of the window panel to illuminate the object; means concealing the object and said illuminating means from view through the window panel; the mirror being disposed and directed to produce a real image of substantially the same size as the article advertised at a point back of the panel and visible therethrough in a position offset from said object-concealing means, and the caption upon the object being so designed and placed upon the object that said image will present the characteristic appearance of the commercial article advertised; and means to prevent the appearance of the object-concealing means in said real image.

In testimony whereof I hereunto affix my signature.

MALCOLM CURRY.